Dec. 2, 1969  A. W. BUCK  3,482,097
X-RAY FILM CASSETTE

Filed May 1, 1967  2 Sheets-Sheet 1

INVENTOR
ARTHUR W. BUCK

BY *Jacobi & Davidson*

ATTORNEYS.

Dec. 2, 1969            A. W. BUCK            3,482,097

X-RAY FILM CASSETTE

Filed May 1, 1967            2 Sheets-Sheet 2

INVENTOR
ARTHUR W. BUCK

BY Jacobi & Davidson

ATTORNEYS.

United States Patent Office 3,482,097
Patented Dec. 2, 1969

3,482,097
X-RAY FILM CASSETTE
Arthur W. Buck, St. Louis, Mo., assignor to Buck
X-Ograph Company, St. Louis, Mo., a corporation
of Missouri
Filed May 1, 1967, Ser. No. 635,200
Int. Cl. H05g 1/60
U.S. Cl. 250—68                                    4 Claims

ABSTRACT OF THE DISCLOSURE

A film cassette for holding radiographic film in perfect contact with two intensifying screens. The movable rear cover of the cassette includes a centrally depressed portion and a slightly depressed peripheral edge portion and carries a pair of spring fingers which are engageable in recesses in the cassette frame. The depressed portions of the cover in combination with the biasing action of the spring fingers serve to very tightly press a pair of intensifying screens into intimate contact with a sheet of radiographic film disposed therebetween to assure precise reproduction of the screen image on the film.

---

This invention relates to a film cassette for holding radiographic film, such as is used for making X-ray pictures, and more particularly it relates to an improved cover construction on such a cassette to assure a perfect intimate contact between a sheet of radiographic film disposed within a cassette and upper and lower intensifying screens disposed at opposite sides of the film.

Film cassetttes of this general type are known in the art and are customarily utilized in preparation of medical X-ray pictures. Examples of these known types of film cassettes are shown in my prior United States Patents Nos. 1,997,557 and 3,191,032. Each of these prior patents describes in some detail a construction of the frame, the cover, the forward Bakelite panel, and so on. In general, it can be stated and seen from my prior patents that the usual construction of such X-ray film cassettes includes a square or rectangular frame, a Bakelite panel tightly mounted in such frame and a cover hingeably attached to the frame, and swingable toward and away from the Bakelite front panel. A felt layer or cushion is carried on the inside of the cover, thus being directed toward the Bakelite panel, and a pair of rotatable spring fingers are carried on the exterior of the cover, such fingers being rotatable to engage in recess in the frame, thereby locking the cover in closed position. At least one, and preferably a pair of intensifying screens are provided within the cassette, between the felt cushion and the inner surface of the Bakelite panel. The radiographic film sheet is disposed between these intensifying screens, and when the cover is closed, it is intended that the radiographic film be completely protected from ambient light and that the intensifying screens be in contact with the radiographic sheet. Then, customarily, a portion of the human anatomy is disposed in front of the Bakelite panel and X-rays are passed therethrough to expose an appropriate portion of the film within the cassette.

While the cassette construction shown in my aforementioned prior patents have proved satisfactory and have been widely used and accepted in the industry, it has nevertheless been discovered that contact between the intensifying screens and the radiographic film sheet is not always as perfect or intimate as might be desired. If a perfect completely intimate contact between the film and the screens is achieved, the resultant grid formed on the screen is clear, non-distorted and extremely fine-lined, having no blurry spots where the vertical and horizontal grid lines cross one another. On the other hand, if the contact between the screens and film is less than perfect, as is often the case utilizing prior art forms of film cassettes, there is a tendency for the lines to blur where they cross one another. In other words, the resolution of the grid on the film has not always been as perfect as is desirable when such prior art forms of cassettes are used.

With the foregoing in mind, it is, therefore, an object of the present invention to provide an improved form of X-ray film cassette which assures that there will always be perfect intimate contact between the intensifying screens and the film mounted within the cassette.

Another object of the present invention is to provide an X-ray film cassette having an improved cover portion which exerts greater pressure on the intensifying screens and the film to assure a more perfect and positive contact therebetween.

Another object of the present invention is to provide an improved X-ray film cassette which overcomes difficulties previously encountered in prior art forms of film cassettes and which provides instead, a film cassette wherein perfect contact between the intensifying screens and the radiographic sheet is readily achieved.

Other objects, advantages and salient features of the present invetnion will become apparent from the following detailed description, which, taken in conjunction with the annexed drawings, discloses a preferred embodiment of the invention.

Referring to the drawings.

Figure 5:
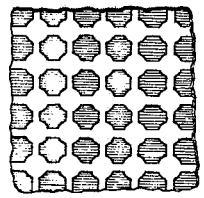
Figure 4:
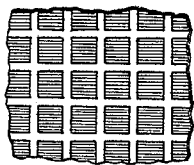

FIGURE 4 is an enlarged fragmentary plan view of a portion of the exposed radiographic film which has been in perfect and intimate contact with the surrounding intensifying screens, through utilization of the cassette of the present invention; and, FIGURE 5 is a fragmentary elevational view of an exposed radiographic film produced in a prior art form of cassette where the film and intensifying screens were not in perfect and intimate contact.

Figure 1:
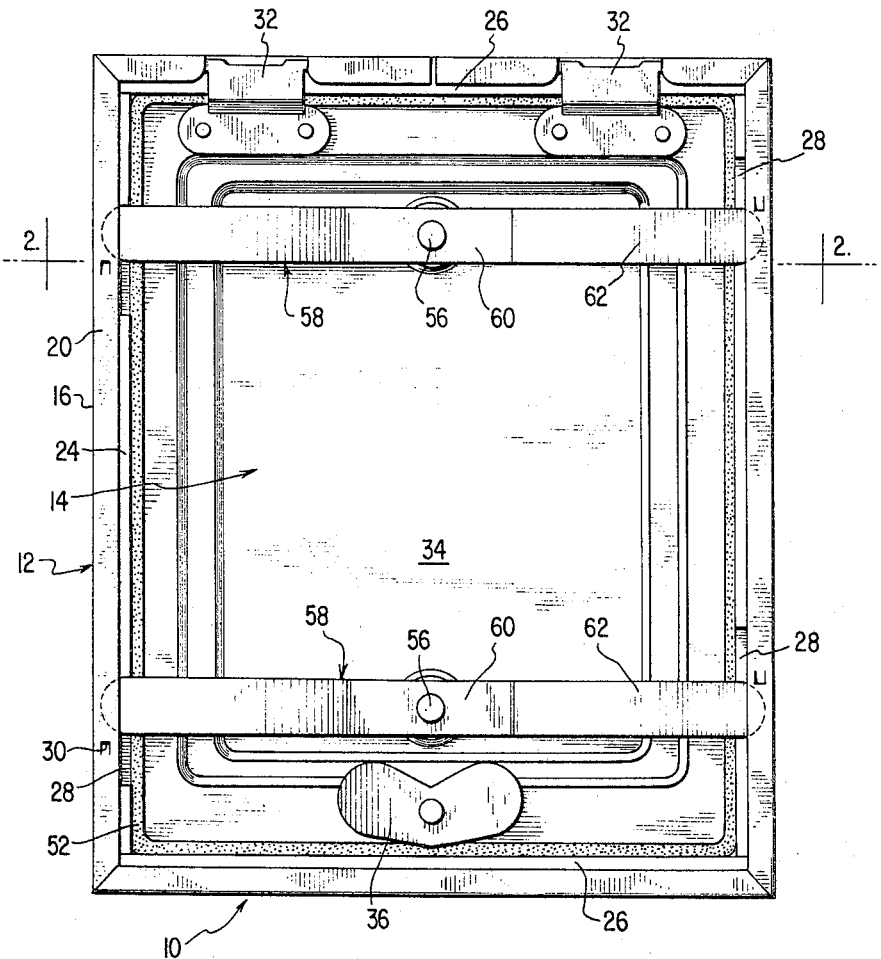
FIGURE 1 is a rear elevational view of a film cassette in accordance with the principles of the present invention.

With continued reference to the drawings, there is shown in FIGURE 1 an improved X-ray film cassette in accordance with the present invention, such cassette being generally designated 10. This cassette includes a rectangular frame means generally designated 12, forming the periphery thereof and a swingable rear cover means generally designated 14.

Figure 2:
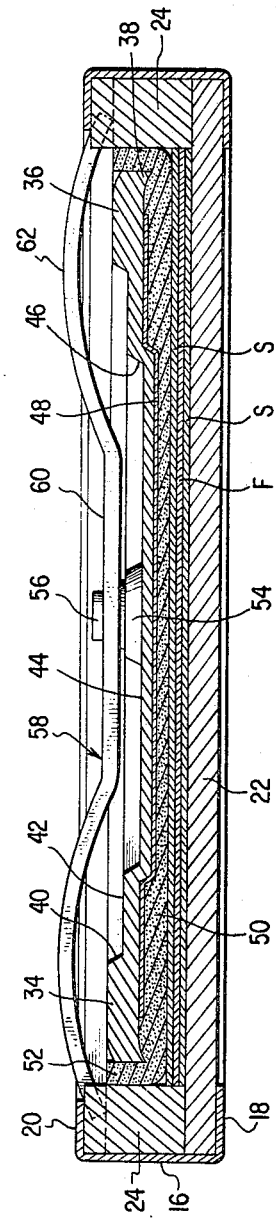
FIGURE 2 is a transverse sectional view thereof taken substantially along the line 2—2 of FIGURE 1.

The frame means 12, as shown in FIGURES 1 and 2, is substantially the same as the frame means illustrated in my prior Patent No. 3,191,032. Specifically, it includes a generally C-shaped channel 16 having an inwardly directed forward flange means 18 and a slightly shorter inwardly directed rearward flange means 20. A front sheet or forward panel 22, fabricated of Bakelite, is disposed within the channel means 16 with the marginal edges of the sheet or panel resting upon the inwardly directed forward flanges 18. A pair of side bar members 24 are mounted within the channel 16 along the opposite sides thereof, such side bar members being interposed between the rear surface of the panel 22 and the inwardly directed rearward flanges 20. End bar members 26 are also positioned within the channel 16 at the ends thereof and the side bars 24 and end bars 26 serve to tightly position the panel 22 within the frame 12.

The exact construction of the side bar members 24 and the end bar members 26 may be seen in further detail in my prior Patent No. 3,191,032, but for present purposes, it is sufficient to state that each side bar member carries a pair of spaced apart recesses 28 formed in the upper surface thereof to thereby provide a channel or passage beneath the inwardly directed flange 20 in order to accommodate the ends of the spring fingers carried by the rear cover 14. A small tab or tang 30 is punched from the flange 20 above each recess 28, such tang being downwardly directed at least partially into the recess or pocket formed therebeneath.

A pair of hinges 32, 32 are used to pivotally connect the cover means 14 to one end of the frame 12, and the precise construction of these hinge means can be seen from either my prior Patent No. 1,997,567 or my prior Patent No. 3,191,032. These hinges 32 are connected to one end of the rear plate or panel 34 which forms the outermost surface of the cover means 14, and a suitable lifting tab or flexible handle 35 is carried at the opposite end of the plate 34 so that, when the spring fingers are unlocked, the cover means can be swung about the hinges 32 and moved away from the Bakelite panel 22.

If attention is now directed to FIGURE 2, it can be seen that, in operation, a radiographic film sheet designated F is sandwiched between a pair of intensifying screens designated S. This sandwich of the screens and film is placed within the cassette in abutting contact with the inner or rear surface of the Bakelite panel 22. When the screens S are pressed into very tight and intimate contact with the film F, the subsequent exposure of the film will result in the formation of a very regular grid type image thereon, as shown on FIGURE 4. On the other hand, if the contact between the screens S and the film F is not as firm as it is desirable, then the resultant grid image will be somewhat more blurry, particularly where the coordinates of the grid cross one another, and this condition is illustrated in FIGURE 5.

The construction of the cover means 14 of the present invention assures that the screens S will always firmly press into intimate contact with the film F so that the condition of FIGURE 5 is avoided and so that the grid will always be regular and proper as shown in FIGURE 4. To this end, it will be noted that a rear panel 34 includes an outer marginal portion 36 whose edge 38 is slightly bent or curled downwardly. For purposes of strength and rigidity, this edge portion 36 is of somewhat thicker construction than the remaining portion of the plate 34, and at a shoulder portion 40, spaced inwardly from the edge 38, the plate decreases in thickness to a further portion 42. This portion 42, however, carries a centrally depressed area 44 formed by a stepped down or forwardly directed shoulder 46. Thus, as can be seen from FIGURE 2, the center of the rear cover, formed by the area 44, is recessed or depressed in the direction of the Bakelite sheet 22.

The major portion of the inner or forward surface of the plate 34 is lined with a very thin lead foil 48 which is intended to prevent any secondary radiation when the X-ray film is being exposed. Then, the entire inner surface of the panel 34 is lined with a felt pad or cushion 50 is adhesively attached thereto. This cushion 50 also includes folded edge portions 52 which extend around the edges of the panel 34, between the side bars 24 and the end bars 26, to prevent any light from leaking into the interior of the cassette. It is this felt cushion or pad 50 which serves to press against the rearwardmost of the screens S and which thus serves to press such screens against the film F.

Figure 3:
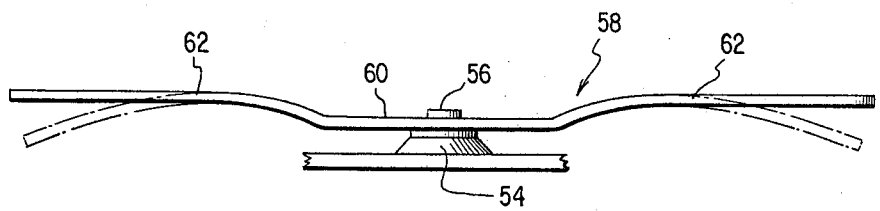
FIGURE 3 is a side elevational view of the spring fingers utilized on the cassette of the present invention.

It will be noted that a pair of centrally raised lands or bosses 54 are provided at the recess portion 44 of the rear panel in order to support a pivot mounting means 56. The purpose for this pivot mounting means is to centrally and rotatably mount a spring finger means generally designated 58. Each spring finger is a flat resilient band of metallic material having a central portion 60 and a pair of upwardly arched arms or end portions 62. As can best be seen from FIGURE 3, these end portions 62 are elevated slightly above the center portion 60 and then tend to extend generally horizontally or straight outwardly with the opposite end portions 62 being substantially coplanar. This is the condition, of course, when the spring fingers are free and unlocked, as they are shown in solid lines in FIGURE 3. However, when it is desired to lock the cover means 14 closed, the terminal ends of the portions 62 are rotated through pivoting of the spring finger about its central pivot 56 until such ends enter into recesses 28 formed along opposite sides of the cassette frame. This condition is shown in solid lines in FIGURE 2 and in dotted lines in FIGURE 3. In particular, it can be seen that when the spring fingers are locked into their respective side recesses, the portions 62 thereof are generally arched or bowed, thereby exerting an additional inward biasing force on the cover means 14.

As a result of the aforementioned improved construction, when the cover means is closed and the spring fingers are locked as is shown in FIGURE 2, at least the central portion of the felt pad or cushion 50 beneath the centrally depressed portion 44, and that portion of the pad or cushion beneath the edge portions 38, is rather tightly compressed. This compressing of the felt cushion or pad is created primarily by the inwardly directed condition of the portions 44 and 38 on the cover plate 34, but is also created by the inward biasing force exerted through the bowed or arched spring finger portions 62. At any rate, the combination of the particular cover construction and the particular spring finger constructions serves to assure that when the cover means is swung to a closed position, a very high degree of pressure will be exerted between the felt cushion 50 and the inner surface of the Bakelite sheet 22, thereby assuring that the intensifying screens S will be in very firm and intimate contact with the radiographic film sheet F.

It will thus be understood and appreciated that the particular construction of the cover means 14 of the cassete of the present invention serves to assure that in each and every instance, the exposed radiographic film sheet F will have a very fine and accurate grid image formed thereon in the manner shown in FIGURE 4, and any blurring or other distortion of the grid means as shown in FIGURE 5, which occurred in prior art forms of cassettes, is clearly avoided. As an added feature of the present invention, the centrally depressed panel portion 44 serves to strengthen and rigidify the entire rear cover means 14 so that there will be absolutely no distortions or undesired bending or flexure thereof no matter how many times the cassette is opened and closed.

After reading the foregoing detailed description, it should be apparent that the objects set forth at the outset of the specification have been successfully achieved by the present invention. Accordingly,

What is claimed is:

1. In an X-ray film cassette of the type having a peripheral frame means, a Bakelite forward panel mounted within said frame means and a rear cover means hingeably attached to said frame means and being swingable toward and away from said forward panel; said cassette being adapted to maintain a radiographic film sheet between a pair of intensifying screens with said sheet and screens forming a sandwich, said sandwich being positioned between said forward panel and said rear cover means, the improvement in said rear cover means for pressing said intensifying screens of said sandwich into intimate contact with said radiographic film sheet thereof, said improvement comprising:

said rear cover means including a rear panel carrying hinge means for hingeably attaching said cover means to said frame means;

said rear panel having a peripheral edge curved forwardly and laterally and directed toward said forward panel;

said rear panel also having a centrally recessed portion positioned in a plane parallel to but disposed forwardly of a plane containing at least a portion of said rear panel between said peripheral edge and said centrally recessed portion;

said rear cover means further including a sheet of compressible material attached to the forward surface of said rear panel and extending about the peripheral edge thereof;

said rear cover means further including rotatable locking means engageable with said frame means to lock said cover means is closed position;

said peripheral edge and said centrally recessed portion serving to compress said sheet of compressible material when said rear cover means is locked closed, with said compression serving to exert pressure on said sandwich to press said intensifying screens into intimate contact with said radiographic film sheet.

2. The improvement defined in claim 1 wherein said centrally recessed portion includes along the rearward surface thereof, a pair of raised bosses each carrying a pivotal mounting means and wherein said locking means includes a pair of resilient spring fingers each of which is centrally connected with said cover means by said pivotal mounting means.

3. The improvement defined in claim 2 wherein said spring fingers are each formed of a flat resilient strip having a pair of end arm portions disposed in coplanar relationship and a central portion between said end arm portions in a parallel and forwardly directed plane, said central portion being connected with said pivotal mounting means.

4. The improvement defined in claim 3 wherein said frame means includes pockets into which the free ends of said end arm portions are inserted to lock said cover means in closed position, said end arm portions being arched away from said rear panel when said free ends are inserted in said pockets with said arched arm portions thus providing a biasing force which serves to additionally compress said sheet of compressible material.

References Cited

UNITED STATES PATENTS

| | | | |
|---|---|---|---|
| 1,897,621 | 2/1933 | Reuter | 250—68 |
| 1,997,557 | 4/1935 | Buck | 250—68 |
| 2,878,389 | 3/1959 | Raffman | 250—68 |
| 3,153,145 | 10/1964 | Yerkovich | 250—68 |

WILLIAM F. LINQUIST, Primary Examiner